United States Patent [19]

Tebben

[11] Patent Number: 4,650,005

[45] Date of Patent: Mar. 17, 1987

[54] ROW CROP CULTIVATOR WITH SETTING INDICATOR

[76] Inventor: John A. Tebben, E. Highway 23, Clara City, Minn. 56222

[21] Appl. No.: 677,385

[22] Filed: Dec. 3, 1984

Related U.S. Application Data

[63] Continuation-in-part of Ser. No. 566,040, Dec. 27, 1983, Pat. No. 4,607,705.

[51] Int. Cl.⁴ .................. A01B 21/08; A01B 71/02
[52] U.S. Cl. ................................ 172/430; 33/534; 172/574; 172/603
[58] Field of Search .............. 172/430, 603, 662, 683, 172/742, 744, 574; 116/300, 301; 33/1 N, 169 B, 185 V, 534; 37/DIG. 19; 403/27

[56] References Cited

U.S. PATENT DOCUMENTS

| | | | |
|---|---|---|---|
| Re. 19,846 | 2/1936 | Ronning et al. | 172/430 X |
| 239,918 | 4/1881 | Bates | 172/430 |
| 301,597 | 7/1884 | Horst | 172/574 |
| 757,371 | 4/1904 | Wagner | 172/430 |
| 1,028,053 | 5/1912 | Mikesell | 172/742 X |
| 1,164,518 | 12/1915 | Herdlein | 172/603 X |
| 1,459,500 | 6/1923 | Cady | 33/169 R |
| 1,499,536 | 7/1924 | Kelly | 172/603 |
| 1,742,401 | 1/1930 | Lavender | 172/603 |
| 2,430,434 | 11/1947 | Rutter | 172/574 X |
| 2,830,374 | 4/1958 | Aivaz | 33/534 |
| 2,851,799 | 9/1958 | Meents et al. | 37/DIG. 19 X |
| 2,973,819 | 3/1961 | Simmons | 172/603 X |
| 3,045,355 | 7/1962 | Woods | 33/185 V |
| 4,477,149 | 10/1984 | Crespy | 33/1 N X |
| 4,483,075 | 11/1984 | Kundin | 33/534 X |

FOREIGN PATENT DOCUMENTS

| | | | |
|---|---|---|---|
| 330402 | 12/1920 | Fed. Rep. of Germany | 172/662 |
| 2855357 | 7/1980 | Fed. Rep. of Germany | 33/169 B |

*Primary Examiner*—Richard T. Stouffer
*Attorney, Agent, or Firm*—Woodard, Weikart, Emhardt & Naughton

[57] ABSTRACT

A row crop cultivator for use in farming which includes a pair of weeding disks associated with each cultivator unit of which a plurality is ganged together in series. Each weeding disk is bearingly supported by a vertical shaft which is received by a cross bar in a manner which permits the shaft associated with the weeding disk to be adjusted as to depth and angular orientation. Such changes in the vertical shaft for the weeding disks are directly transferred to the weeding disk itself. Disposed adjacent the uppermost point of the shaft is a degree gauge plate and adjacent thereto is a depth gauge structured out of angle iron. As the farmer makes adjustments as to angular orientation and depth of one weeding disk, he need not be concerned with the specific values until the optimum depth and angular orientation have been found for the particular field being cultivated. Once this has been determined for a single weeding disk, all other disks of the cultivator can be almost instantly set to the same indicator values thereby duplicating the desired depth and angular position of the corresponding disks. Each weeding disk, degree gauge plate and depth gauge are supported by a corresponding frame which is pivotally hinged to the tool bar of the cultivator and positionable in either a weeding-disk up position or a weeding-disk-down position.

4 Claims, 6 Drawing Figures

ROW CROP CULTIVATOR WITH SETTING INDICATOR

REFERENCE TO RELATED APPLICATION

This application is a continuation-in-part application of my prior copending application which was filed Dec. 27, 1983 and assigned Ser. No. 566,040, now U.S. Pat. No. 4,607,705.

BACKGROUND OF THE INVENTION

The present invention relates in general to farm implements and more particularly to row crop cultivators wherein the weeding disks must be set as to depth and angle.

The primary purpose of disks, field cultivators and related soil-preparation implements is to cut and break up the soil in order to create a suitable seed bed prior to planting. One facet of this preparation, as well as a necessity after crops have been planted, is to destroy weeds and this is accomplished by the use of a row crop cultivator having weeding disks which are set at a penetration depth into the soil and at an angle relative to the longitudinal direction of the crop row. Normally, two opposing disks are associated with each crop row being prepared. When the row crop cultivator is configured for a multiple number of rows, such as six, eight or twelve rows, there is an associated and corresponding pair of weeding disks for each row. It is important that the depth and angle settings of each weeding disk coincide with all other weeding disks so that each crop row which is simultaneously prepared by the cultivator is uniformly prepared.

While adjustments to the depth and angle of the disks may be easily made, determination of the proper settings is quite time consuming. After the cultivator is used over a small portion of the field, the farmer must stop, get out of the cab, and check the condition of the soil which has been prepared by the cultivator. If the depth or angle of the weeding disks is not suitable, based upon the farmer's inspection of the weeds being cut and the prepared soil, then adjustments must be made to these disks and thereafter another portion of the field cultivated. After this second cultivation phase, the farmer again checks the soil and repeats this procedure until the depth and angle of the weeding disks meets with his approval. This repetitive procedure may take many hours to complete, and whatever time is required for one weeding disk must be multiplied by the total number of disks which are present as part of the cultivator. While each disk can be changed at each stopping point of the cultivator, at which time the farmer examines the soil, there is no way to correlate an acceptable setting on one weeding disk to another disk. Consequently, each weeding disk must be independently and repeatedly adjusted until the soil preparation for each row is proper and suitable to the farmer.

The present invention offers an improvement to the foregoing cultivator design by providing indicators of the depth and angle settings for each weeding disk. Uniquely, these indicators do not require any additional steps or effort. As the farmer adjusts the depth and angle of one weeding disk, the selected depth and angle are automatically indicated, and once the first weeding disk is set, all other weeding disks may be instantly set without any need for the tedious and repetitious trial and error procedure previously outlined. The time to fully set the cultivator can be reduced from one to two days to approximately two hours.

Since these weeding disks (also referred to as cut-a-ways) are only used in the first cultivation to pull dirt and weeds away from the row, the cut-a-ways are removed for the second cultivation. During this second cultivation most farmers ridge with only the large sweep and the ridger in the rear of the cultivator.

While removal of the cut-a-ways only involves removal of 36 or so bolts, and since it only happens once a year (for one crop), it is not a major problem or concern. However, one must not forget that when a farmer's corn is ready for second cultivation, his beans may not be ready for even their first cultivation because they are too small. As a result, this on-off step of disassembly and then reassembly of the cut-a-ways must be repeated. Even if the issue of 36 bolts is not viewed as a major concern, when the cut-a-ways are reassembled, the prior depth and angle settings must all be reset.

An additional feature of the present invention is a hinge mechanism which allows the weeding disks as well as their indicators to pivot back out of use when not required, without losing their previously established depth and angle settings.

Although indicators for depth and angles are known in the art, none are associated with the weeding disks of a row crop cultivator. Further, none of the indicators known to the inventor utilize the combination wherein the device for denoting the depth serves as a marker for the angle and vice versa. Additionally, none of the cultivators known to the inventor include any type of hinge mechanism for pivoting the disks up and out of the way. The prior references which the inventor is aware of and that may be relevant are the following.

| Patent No. | Patentee |
| --- | --- |
| 3,045,355 | Woods |
| 239,918 | Bates |
| 757,371 | Wagner |
| 2,430,434 | Rutter |
| 1,164,518 | Herdlein |
| Re. 19,846 | Ronning et al. |
| 2,851,799 | Meents et al. |

Woods discloses a plow depth indicator which includes a slidable support shaft on which a series of depth graduations are disposed. The support shaft is connected to a wheel and plow point combination, and the depth graduations indicate the depth into the ground at which the plow point is running. The purpose of these depth graduations are only for a determination of the plow point depth and are not utilized in any other matter such as repetition of the settings for other plow points. Further, the depth is determined by the sleeve through which the support shaft slides. There is no angular adjustment indicated by the disclosure of this reference nor is there any gauge or setting for the reading of an angular adjustment of the plow point.

Bates discloses a plow design wherein the plow points are integrally disposed in combination with a pair of brace members and an upwardly extending arm, all of which are carried by a beam. The upwardly extending arm includes a plurality of graduations in order to be able to set the plows at their desired height for the work to be accomplished. Although two plows are indicated, they are for the purposes of cutting different furrows, and there is no indication that the depth settings are adjusted nor that there is any correlation between the settings for one plow and the settings for another.

Wagner discloses a disk plow wherein the individual disks may be independently adjusted by means of a linkage so as to vary their respective angularity relative to the line of direction of motion of the farm vehicle which is pulling the various disks. Part of the linkage is formed with a pointer or index and a series of graduations formed on the outer edge of one of the lever arms. These graduations merely serve to identify the orientation of the corresponding disk, and there is no indication in this reference of either variable depth adjustments nor the repetitive procedure of determining the proper angle and depth and duplicating that setting to the other disks as is accomplished by the present invention.

Rutter discloses a clamping device for tool standards, and in the disclosed embodiment, a disk is provided as a representative tool or attachment. This particular patent merely discloses a mechanical linkage means for angular adjustment of the disk, but there are not any graduations or other indicator as to the position which is ultimately selected.

Ronning discloses a combination tractor/grader wherein the scraper blade is manually adjustable by means of a somewhat complicated and remote linkage arrangement. This complicated linkage arrangement is disclosed primarily in FIG. 2 and is read in combination with FIG. 3. This linkage arrangement provides both an indication as to whether or not the scraper blade is working on the level or is horizontally disposed and graduations are provided in order to indicate the depth of cut at which the scraper blade is set to work. The differences between this design and the present invention are found in the relationship between the angle and depth indicators as well as the ease of adjustment. The desired angle and depth settings of Ronning may be arbitrarily selected by the operator of the tractor and easily changed or adjusted. The operator likely knows the proper angle and depth to be selected and thus merely sets the equipment for the desired numerical values. With the present invention, the farmer is unable to ascertain whether or not the settings are proper for the particular soil and weed conditions and must actually test the results before making adjustments. Consequently, specific angular values and depth numbers have very little correlation since they will vary with the soil conditions. Further, with the present patent, there is but a single blade and consequently there is no need nor concern as to correlation between the proper settings on one tool with those of similar tools of a ganged series. Finally, the present invention provides a novel cooperation between the angular indicator and the depth indicator which cooperation is clearly not found in the Ronning reference, and this relationship will be disclosed hereinafter.

Meents discloses a gauge for determining vertical heights and depths such as can be utilized in connection with mechanical ditch diggers and related equipment for accurately maintaining the grade of the cut. The disclosed mechanism is apparently also useful for ascertaining vertical heights of a slanting bore or hole. The device is not a direct-reading instrument, but involves a complicated mechanism and linkage internal to its housing which receives outside data which must be correlated by the mechanism and thereafter angle and depth readings taken. This particular device is unrelated to farm implements or to weeding disks, the area of art to which the present invention pertains, and there is no indication by this reference that the angle and depth indicators could be directly arranged as part of a row crop cultivator weeding disk as is provided by the present invention.

Herdlein discloses a disk cultivator arrangement wherein the individual disks are adjustable as to their angular orientation by a linkage arrangement which includes lever 49. This lever is pivoted to a split ring which is held on the upper end of the support shaft which carries the disk. As can be seen from the disclosed arrangement, there is no variation as to the depth setting nor any correlation between the indicator for the angular orientation and any possible indicator for depth.

What will be understood from the disclosure of the present invention which follows is that the support shaft for the weeding disk of a row crop cultivator is directly assembled to a degree gauge plate which is used as a marker to denote the depth at which the weeding disk is operating in the soil by means of a cooperating and adjacent depth gauge. In turn, the vertex edge of the depth gauge, which may be a a piece of angle iron, serves as the pointer or indicator for reading the degree setting from the degree gauge plate. This cooperative or symbiotic relationship between the two indicators is unique over any of the references and clearly not anticipated nor rendered obvious by any reference. Further, none of the references disclose a situation wherein individual angle and depth settings of a plurality of weeding disks must be made, nor do any of the references address the present and very real problem of repetitive settings and fine-tuning of a plurality of weeding disks in order to arrive at a final setting which is suitable for the particular field and soil conditions being cultivated.

Finally, the hinge feature and its importance to this overall invention should not be minimized. Even though significant time savings are afforded by the indicators for depth and angle, the ability to shift from crop to crop and first cultivation to second cultivation without losing previously established settings enhances the value of the indicators.

Only by the present invention is there offered a means to reduce the tedious and time-consuming task of properly setting each of the weeding disks. Further, a cooperative relationship between the two types of indicators permits an easy modification to existing row crop cultivators as well as simplicity and low cost to the original equipment manufacturer. An understanding of the various differences between the present invention and the prior art and the benefits provided by the present invention will be more fully understood by reference to the following description.

SUMMARY OF THE INVENTION

A row crop cultivator suitably styled to be drawn by a tractor or similar vehicle and which includes a frame structure and linkage means suitable to receive various implement attachments according to one embodiment of the present invention comprises the improvement of a plurality of weeding disk assemblies, each assembly including a weeding disk and a corresponding support shaft, each disk being rotatably mounted to its corresponding support shaft, separate adjustment means associated with each support shaft for enabling each corresponding weeding disk to be altered as to its depth and angular orientation, and a plurality of brackets pivotally hinged to the row crop cultivator, each bracket receiving a corresponding weeding disk assembly and a corresponding adjustment means, and being movable between a weeding-disk-down position and a weeding-disk-up position.

One object of the present invention is to provide an improved row crop cultivator.

Related objects and advantages of the present invention will be apparent from the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 1:
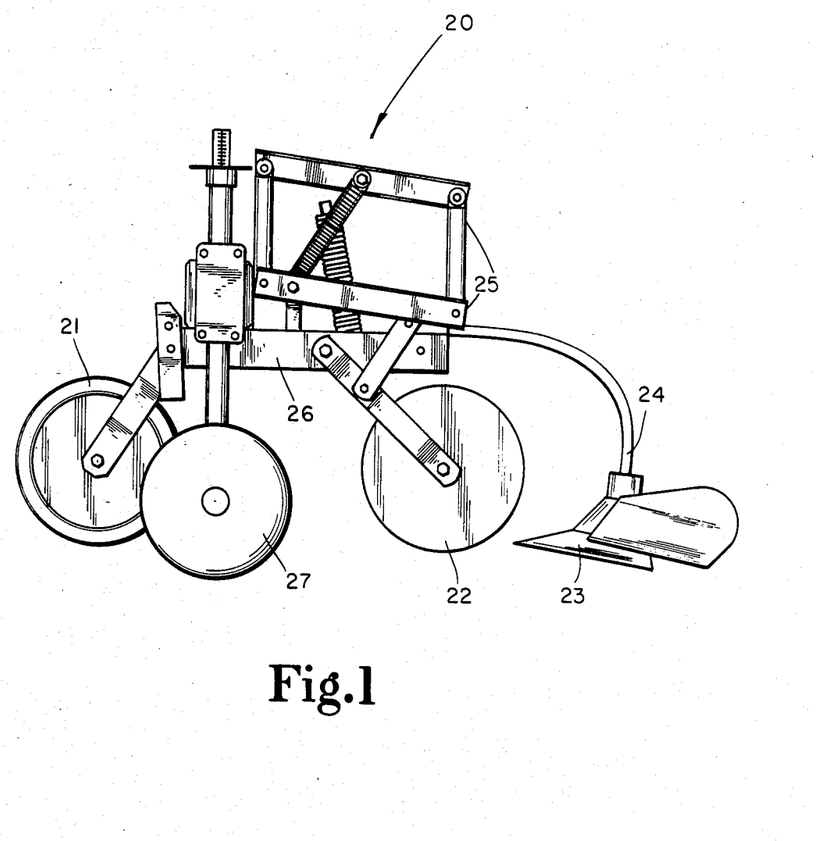
FIG. 1 is a side elevation view of a row crop cultivator unit according to a typical embodiment of the present invention.

Referring to FIG. 1, there is illustrated a row crop cultivator unit 20 which represents merely one of a plurality of such units that would normally be incorporated as part of a row crop cultivator. It is to be understood that since the primary purpose of disks, field cultivators and other soil preparation tools is to create a seed bed and destroy weeds prior to as well as after planting, the larger the number of furrows that can economically be prepared simultaneously, the more efficient will be the farmer's use of his time. For this reason, row crop cultivators are typically arranged with either four, six or eight row crop cultivator units, such as that illustrated in FIG. 1, in a nonfolding structure. If the row crop cultivator is going to include a folding series of cultivator units, then there may be eight or twelve such units in series. Obviously, the benefit of a folding design is to allow the wider dimension to be reduced so that the tractor may pull the cultivator across county roads and highways.

Although a single row crop cultivator unit 20 has been illustrated in FIG. 1, it is to be understood from the foregoing discussion that a plurality of similar units are arranged in a ganged series extending side by side across the rear portion of the tractor or farm vehicle which will draw the cultivator across the land.

The disclosed row crop cultivator unit includes a gauge wheel 21, stabilizing coulter 22, sweep 23, shank 24, frame linkage 25, tool bar 26 and weeding disks 27. What has been included as part of unit 20 are those components typically found with a row crop cultivator arrangement. However, it is to be understood that certain of the component parts listed may be modified, added to or replaced by a wide number of options and attachments which the farmer may employ. Clearly, the number of options and attachments available to the farmer will depend upon the type of equipment purchased. However, since the present invention pertains primarily to the disks, these other options or attachments need not be discussed in any greater detail.

Figure 2:
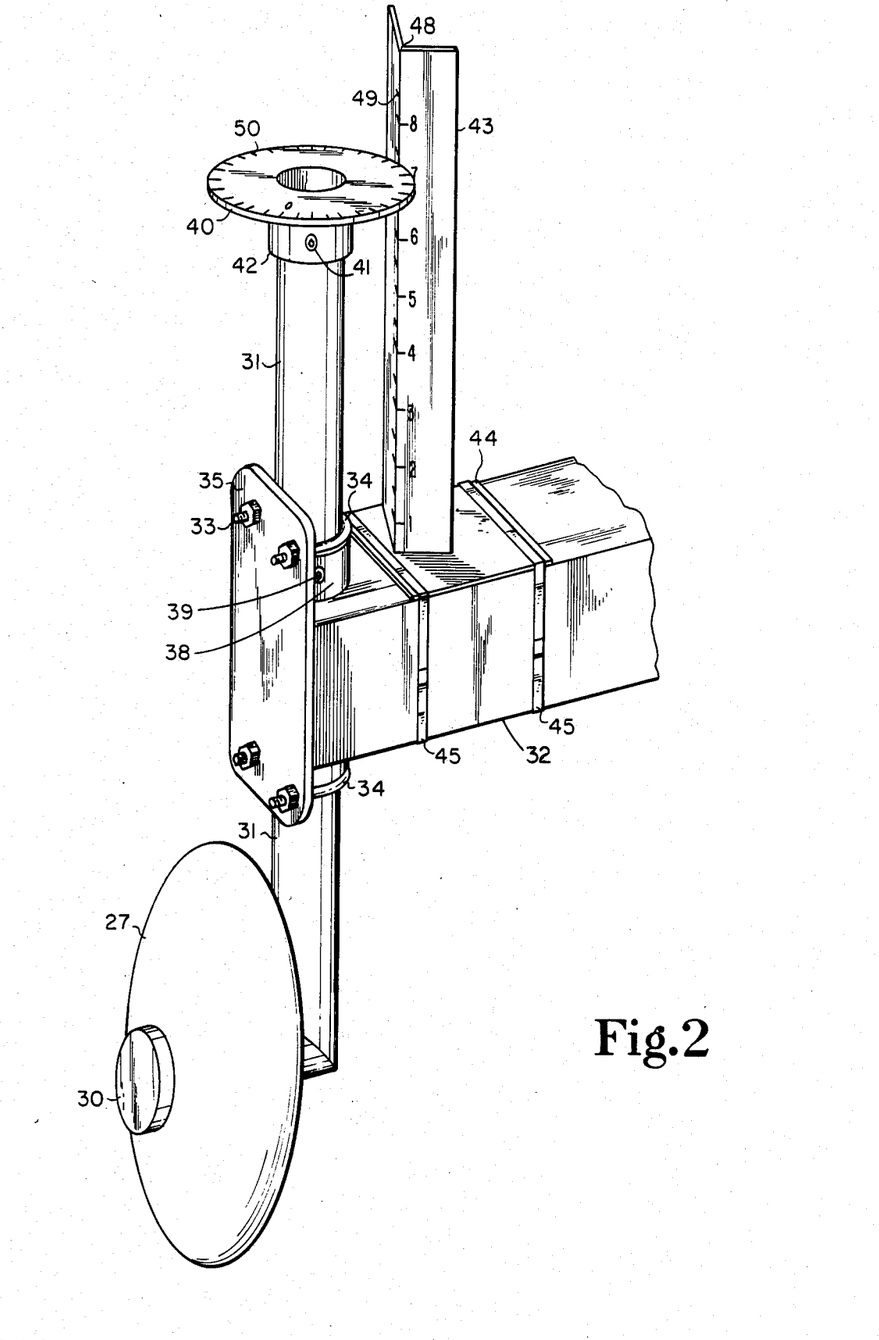
FIG. 2 is a perspective view of a weeding disk assembly comprising part of the FIG. 1 row crop cultivator.
Figure 3:
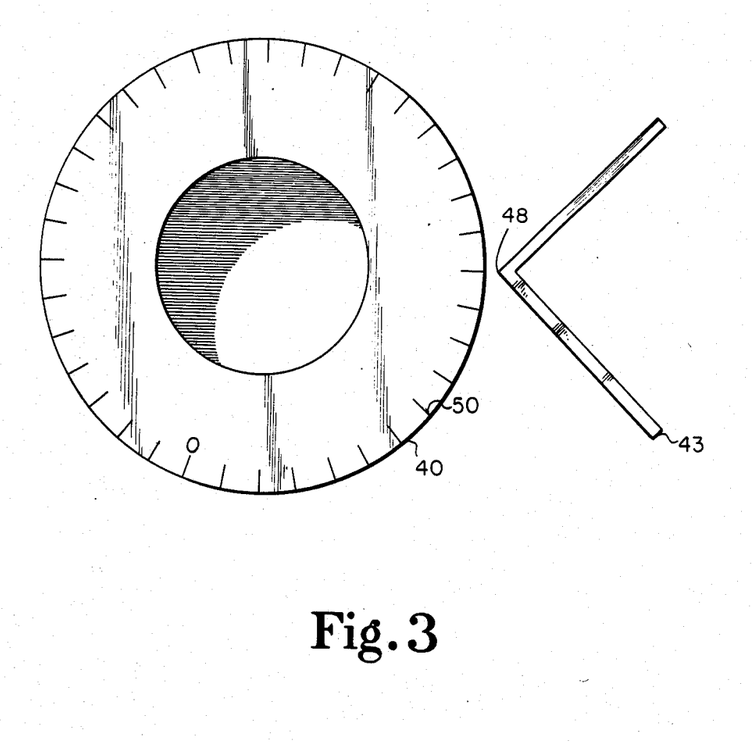
FIG. 3 is a top plan view of a depth gauge and degree gauge plate cooperating with the FIG. 2 weeding disk assembly.

Referring to FIGS. 2 and 3, the nature and assembly of the weeding disks to the remainder of the row crop cultivator unit are illustrated in greater detail. As should be understood, one weeding disk is disposed on each side of the frame linkage 25 and each weeding disk operates in a similar and compatible fashion with every other weeding disk of the cultivator both as to angular orientation relative to the row it is affecting and its depth into the soil. The discussion will now focus merely on a single weeding disk and its associated indicators and structure, it being understood that a virtually identical arrangement is provided for each weeding disk of each row crop cultivator unit and for each unit as part of the entire ganged assembly.

Each weeding disk 27 is bearingly supported on a short axle 30 which in turn is carried by vertical shaft 31. The rigid connection between shaft 31 and axle 30 is such that as shaft 31 is turned or rotated about its longitudinal axis, the angular orientation of weeding disk 27 will be varied. Similarly, as vertical shaft 31 is moved either up or down in a vertical direction, through frame member 32, the depth of the corresponding weeding disk into the soil will be varied.

Frame member 32 extends as a cross member relative to frame linkage 25 and includes at each end a bore or similar mechanical arrangement for slidable and rotatable receipt of the corresponding vertical shaft 31 of each weeding disk. Adjacent the outer end of frame member 32 is a clamping plate 35 which receives the externally threaded ends of clamps 34 which in turn are secured to plate 35 by means of bolts 33. Clamps 34 serve to lock vertical shaft 31 in the selected position both as to its angular orientation as well as its depth. By tightening bolts 33, vertical shaft 31 is locked in its selected position securely enough to maintain the desired angular orientation and depth for the corresponding weeding disk as it passes through the soil.

In the event the farmer wishes to make an adjustment to the weeding disk as to either angular orientation or its depth, the four bolts 33 must be loosened thereafter allowing the plate 35 and clamps 34 to part freeing up shaft 31 and allowing adjustments to be made. Once the desired setting has been made, the bolts are then tightened back in place and the farmer returns to the tractor. A further option is provided by means of collar 38 and its corresponding set screw 39 which cooperate with both frame member 32 and vertical shaft 31 such that the depth setting of shaft 31 will not be affected simply by the loosening of bolts 33. Consequently, if the farmer wishes to merely change the angular orientation, he leaves collar 38 locked to shaft 31 allowing it to be pivoted in any direction to change the angular orientation while it remains disposed against the top surface of frame member 32. When both depth and angular orientation are to be changed, set screw 39 is loosened so that the collar is no longer secured directly to the vertical shaft 31.

Rigidly secured to the top end of shaft 31 is a degree gauge plate 40 which includes a hub 42 through which a set screw 41 is used to secure the plate to the shaft. While this hub and set screw arrangement permits the gauge plate to be added to virtually any existing row crop cultivator, this replaceable feature also is an advantage to original equipment manufacturers. By structuring the gauge plate as a replaceable component, it can be assembled last allowing all other manufacturing and assembly tolerances to be established before the plate is aligned and secured in place. Alternatively, the degree gauge plate 40 could be welded to the vertical shaft 31 and provided as a nonreplaceable component. By securely locking the gauge plate to the vertical shaft in a coaxial manner, it should be understood that they will move as a single unit about the same longitudinal (vertical) axis, both as to angular orientation as well as to depth.

Disposed closely adjacent to degree gauge plate and shaft 31 is depth gauge 43 which, in the exemplary embodiment, is a piece of angle iron welded to a base plate platform 44 which in turn is secured to frame member 32 by means of metal bands 45. It is important that the vertical portion of the depth gauge be substantially perpendicular to its corresponding support shaft so that actual vertical movement of the shaft can be ascertained by knowing the distance between vertical graduations on the depth gauge. As with degree gauge plate 40, if depth gauge 43 is to be provided as part of the original equipment, it may be directly welded to the frame member 32. However, for the same reasons and advantages, gauge 43 is shown as being replaceable in the exemplary embodiment. By constructing depth gauge 43 from a section of angle iron, there is provided a vertex edge 48 between the two flat surfaces. In the disclosed embodiment (see FIG. 3) this vertex edge is pointed directly at the outer peripheral edge of degree gauge plate 40. For drawing clarity, only the degree gauge plate and depth gauge have been illustrated in FIG. 3. The remainder of the structure is shown fully in FIGS. 1 and 2. As is indicated and as is intended by the present invention, this vertex edge serves as a pointer so that the degree gauge plate may be read as of its particular angular orientation relative to the vertex edge. With vertically spaced graduations 49 and circumferentially spaced graduations 50 disposed on the depth gauge and degree gauge plate, respectively, the vertex edge will point directly at the closest graduation 50 and thereby denote the particular angular setting. In a cooperating or symbiotic manner, the top surface of the degree gauge plate 40 serves as a level or an alignment marker for selecting the closest graduation 49 that appears on the depth gauge 43. Consequently, as shaft 31 moves vertically, the degree gauge plate will track accordingly always enabling the top surface of the plate to serve as an alignment means or indicator point for the graduations on the depth gauge. Similarly, as the shaft is rotated, the degree gauge plate rotates in accordance therewith and the vertex edge 48 continues to serve as the pointer in order to denote the angular orientation of the corresponding weeding disk.

As was fully discussed as part of the background of the present invention, a farmer, when using a row crop cultivator, wants to be sure that the angular orientation of each weeding disk and its depth into the soil are proper depending upon the circumstances of the particular field over which the cultivator is being used. By performing the trial and error procedure with regard to a single weeding disk, a farmer is permitted by the present invention to duplicate on all other weeding disks, almost instantly, those settings which are ultimately arrived at as to one weeding disk. So long as each degree gauge plate 40 and each depth gauge 43 (there being one each for each disk) are properly and uniformly initially aligned with respect to their corresponding weeding disk, the settings from these indicators for one disk when duplicated on all remaining disks will result in an exact duplication of the depth and angular orientation. Consequently, in an eight or twelve unit row crop cultivator, the adjustment and setting time can be drastically reduced for the farmer providing critical time savings.

Figure 4:
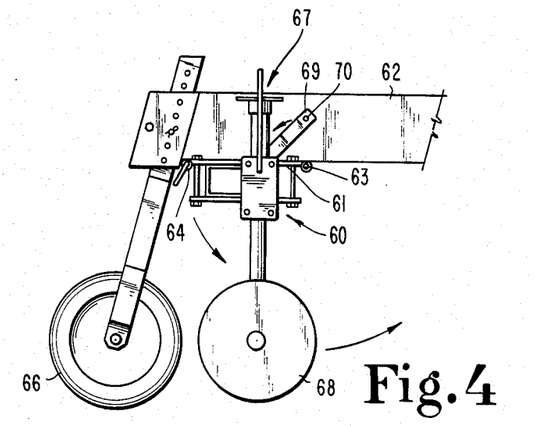
FIG. 4 is a side elevation view of a hinge mechanism in combination with a row crop cultivator unit according to a typical embodiment of the present invention.
Figure 5:
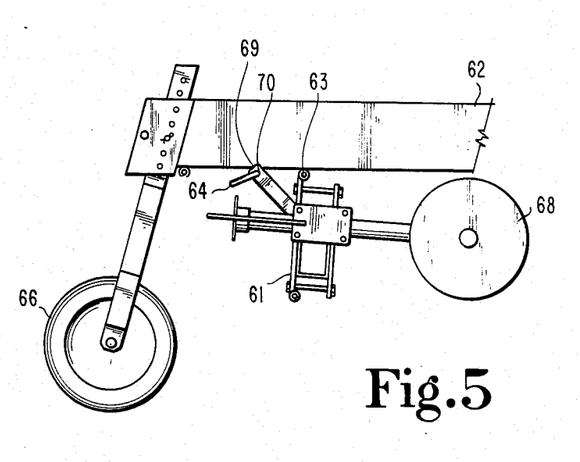
FIG. 5 is a side elevation view of the FIG. 4 row crop cultivator and hinge mechanism with the weeding disk assembly pivoted rearwardly.
Figure 6:
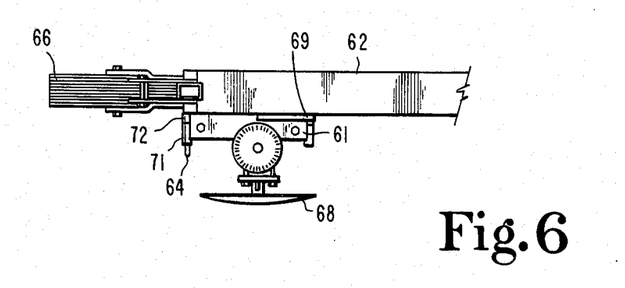
FIG. 6 is a top plan view of the FIG. 4 hinge mechanism.

Referring to FIGS. 4 and 5, there is illustrated a row crop cultivator unit 60 which represents merely one of a plurality of such units that would normally be incorporated as part of a row crop cultivator. Although unit 60 is configured slightly different from unit 20, the structural differences, with the exception of the hinge feature, which will be described hereinafter, is simply a matter of choice and preference. Although the cultivator units (FIGS. 1 and 4) appear different in certain respects, the only substantive differences are those associated with the hinge feature.

Cultivator unit 60 includes bracket assembly 61 which is supported by the underside of tooled bar 62 and is pinned thereto by a pair of pins. Fixed pin 63 remains in its illustrated location regardless of the orientation of bracket assembly 61. Removable pin 64, which may in the alternative be a cylindrical rod with a formed or bent end for easy grasping, serves two purposes. When removable pin 64 is inserted in its location as illustrated in FIG. 4, it locks the bracket assembly 61 in a first cultivation position. This position orients the weeding disk at its proper angle and depth into the soil, this angle and depth having been previously set according to that procedure described earlier.

When removable pin 64 is in the position as illustrated in FIG. 5, bracket assembly 61 is in its second cultivation position and is oriented so as to position the weeding disk up out of the soil and it is thereby unable to interact with either the soil and weeds.

While tool bar 62 supports bracket assembly 61 in the manner illustrated, tool bar 62 also supports gauge wheel 66 as well as the sweep and stabilizing coulter, neither of which are illustrated due to the partial view illustration of FIGS. 4 and 5.

Bracket assembly 61 is similar in style and function to that illustrated in FIG. 2, with the more noticeable differences including the location of the depth gauge 67 and the fact that this assembly is pinned to the tool bar and may be pivoted relative thereto by pulling removable pin 64 and allowing the entire assembly to swing upwardly and rearwardly as illustrated in FIG. 5. This upward and rearward pivoting being about fixed pin 63. In order to secure the weeding disk 68 in an up and out-of-the-way location, bracket arm 69 and hole 70 are used in combination with the removable pin and the underside of the tool bar.

As is illustrated in FIG. 5, with assembly 61 pivoted to the rear, arm 69 is moved downwardly and forward thereby positioning hole 70 just below the underside surface of tool bar 62. Thereafter, removable pin 64 is inserted into hole 70 and the pin is of a sufficient length to both insert into the hole and extend beneath the tool bar. It is the distal end of the removable pin which abuts up against the underside surface of the tool bar and it is the weight of the assembly and the force of gravity acting to pull the assembly down which maintains the pin pushed up against that underside surface.

As an alternative to using the removable pin to abut against the underside surface of the tool bar, it is envisioned that a hole may be provided in some frame member or portion of the tool bar to provide a receiving hole for the removable pin. Either of these methods are acceptable so long as some means is provided to secure the bracket assembly and its associated depth and angle indicators as well as its weeding disk in an up and out-of-the-way position when the second cultivation step is required.

As previously described, when weeding disk 68 is disposed in the elevated position of FIG. 5, it is unable to interact with either the soil or weeds. This then permits the coulter and sweep to be used for the second cultivation steps. Since the weeding disk and its associated angle and depth indicators do not have to be removed from the cultivator, the previously established angle and depth settings can be maintained as the bracket assembly, weeding disk, and indicating systems are pivotally swung from a first cultivation position to a second cultivation position. As indicated, this permits the farmer to switch from one crop which requires a second cultivation step to another crop which requires the first cultivation step and so forth without once losing the angle and depth of the indicating system which has already been set for the first cultivation phase.

When the cultivator is to be "switched" back from second cultivation to a first cultivation, removable pin 64 is pulled from hole 70, thus permitting the assembly to swing downwardly and foward. This causes cylindrical boss 71 of the bracket assembly to once again align itself with cylindrical boss 72 of the tool bar. When these two bosses are oriented so that their respective clearance holes are aligned, removable pin 64 is fully inserted into both bosses. This thus locks the assembly and the corresponding weeding disk in position for first cultivation. Throughout this shifting of the assembly between the two locked positions, up and down, the settings previously made as to angle and depth are unaffected. Consequently, once the settings are made on the angle and depth indicators, they can be preserved, regardless of whether or not the cultivator is used for the first cultivation step or for the second cultivation step.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A row crop cultivator suitably styled to be drawn by a tractor or similar vehicle and which includes a frame structure and linkage means suitable to receive various implement attachments, wherein the improvement comprises:
   a plurality of weeding disk assemblies, each assembly including a weeding disk and a corresponding support shaft, each disk being rotatably mounted to its corresponding support shaft;
   separate adjustment means associated with each support shaft for enabling each corresponding weeding disk to be altered as to its depth and angular orientation;
   a plurality of bracket means pivotally hinged to said row crop cultivator, each of said plurality of bracket means receiving a corresponding one of said plurality of weeding disk assemblies and a corresponding one of said separate adjustment means, and being movable between a weeding-disk-down position and a weeding-disk-up position; and
   separate indicator means associated with each adjustment means for indicating the depth and angular setting of the corresponding weeding disk, said indicator means being cooperatively arranged with said adjustment means such that the duplication of a setting for a first one of said plurality of weeding disks onto another one of said plurality of weeding disks results in a duplication of the positional orientation placement of the first disk by the other disk, each said indicator means including an angular orientation indicator coaxially disposed relative to the upper portion of its corresponding support shaft, each said indicator means further including a depth indicator adjacent a corresponding angular orientation indicator and arranged with a pointing portion directed at said angular orientation indicator for reading the setting thereof.

2. A row crop cultivator suitably styled to be drawn by a tractor or similar vehicle and which includes a frame structure and linkage means suitable to receive various implement attachments, wherein the improvement comprises:
   a plurality of weeding disk assemblies, each assembly including a weeding disk and a corresponding support shaft, each disk being rotatably mounted to its corresponding support shaft;
   separate adjustment means associated with each support shaft for enabling each corresponding weeding disk to be altered as to its depth and angular orientation;
   a plurality of bracket means pivotally hinged to said row crop cultivator, each of said plurality of bracket means receiving a corresponding one of said plurality of weeding disk assemblies and a corresponding one of said separate adjustment means, and being movable between a weeding-disk-down position and a weeding-disk-up position; and
   separate indicator means associated with each adjustment means for indicating the depth and angular setting of the corresponding weeding disk, said indicator means being cooperatively arranged with said adjustment means such that the duplication of a setting for a first one of said plurality of weeding disks onto another one of said plurality of weeding disks results in a duplication of the positional orientation placement of the first disk by the other disk, each said indicator means including a degree plate coaxially disposed about the uppermost end of its corresponding support shaft and a depth gauge disposed substantially parallel to the support shaft and positioned adjacent to the degree plate wherein the degree plate and the depth gauge each include a series of spaced graduations and each serves as the alignment marker for the other.

3. The improvement of claim 2 wherein both the degree plate and the depth gauge are removable from the row crop cultivator.

4. A row crop cultivator suitably styled to be drawn by a tractor or similar vehicle and which includes a frame structure and linkage means suitable to receive various implement attachments, wherein the improvement comprises:
- disk support means including a plurality of support shafts;
- a plurality of weeding disks, each disk being rotatably mounted to a corresponding one of said support shafts;
- separate adjustment means associated with each support shaft for enabling each corresponding weeding disk to be altered as to its depth and angular orientation; and
- separate indicator means associated with each adjustment means for indicating the depth and angular setting of the corresponding weeding disk, said indication means being cooperatively arranged with said adjustment means such that the duplication of a setting for a first one of said weeding disks onto another one of said weeding disks results in a duplication of the positional orientation placement of the first disk by said another disk, said separate indicator means including a degree plate coaxially disposed about the uppermost end of its corresponding support shaft and a depth gauge disposed substantially parallel to the support shaft and positioned adjacent to the degree plate wherein the degree plate and the depth gauge each include a series of spaced graduations and each serves as the alignment marker for the other.

* * * * *

UNITED STATES PATENT AND TRADEMARK OFFICE
CERTIFICATE OF CORRECTION

PATENT NO.   :   4,650,005

DATED        :   March 17, 1987

INVENTOR(S)  :   John A. Tebben

It is certified that error appears in the above-identified patent and that said Letters Patent is hereby corrected as shown below:

In column 12, line 1, the word "indication" should be changed to the word --indicator--.

Signed and Sealed this

First Day of March, 1988

Attest:

DONALD J. QUIGG

Attesting Officer

Commissioner of Patents and Trademarks